United States Patent [19]

Goto et al.

[11] 4,230,211
[45] Oct. 28, 1980

[54] FREE WHEEL HUB APPARATUS FOR VEHICLES

[75] Inventors: Hiromi Goto, Chiryu; Tooru Kagata, Toyota, both of Japan

[73] Assignee: Aisin Seiki Kabushiki Kaisha, Aichi, Japan

[21] Appl. No.: 870,356

[22] Filed: Jan. 18, 1978

[30] Foreign Application Priority Data

Jan. 26, 1977 [JP] Japan .................................... 52/7590

[51] Int. Cl.² ............................................ F16D 41/08
[52] U.S. Cl. ...................................... 192/35; 192/44; 192/47; 403/1
[58] Field of Search .................. 403/1, 24; 192/50 R, 192/44, 47, 35, 36, 38, 93 A

[56] References Cited

U.S. PATENT DOCUMENTS

| | | | |
|---|---|---|---|
| 1,957,500 | 5/1934 | Harris et al. | 192/44 |
| 2,684,140 | 7/1954 | Warn | 403/1 |
| 2,874,814 | 2/1959 | Beck | 403/1 |
| 2,884,101 | 4/1959 | Warn | 192/44 |
| 3,123,169 | 3/1964 | Young et al. | 192/44 X |
| 3,414,096 | 12/1968 | Reed | 192/44 X |
| 3,476,226 | 11/1969 | Massey | 192/44 X |
| 3,788,435 | 1/1974 | Prueter | 192/35 |

*Primary Examiner*—Andrew V. Kundrat
*Attorney, Agent, or Firm*—Oblon, Fisher, Spivak, McClelland & Maier

[57] ABSTRACT

A free wheel hub apparatus for vehicles having a wheel hub and an axle shaft includes a body integrally rotated with the wheel hub, an inner member disposed within the body and integrally rotated with the axle shaft, a bearing member interposed between the inner member and the body, a plurality of rollers interposed between the inner member and the body, a cage for supporting the rollers, and frictional means for engaging or disengaging the cage with or from a knuckle or the body according to the axial movement of the cage by a handle.

4 Claims, 5 Drawing Figures

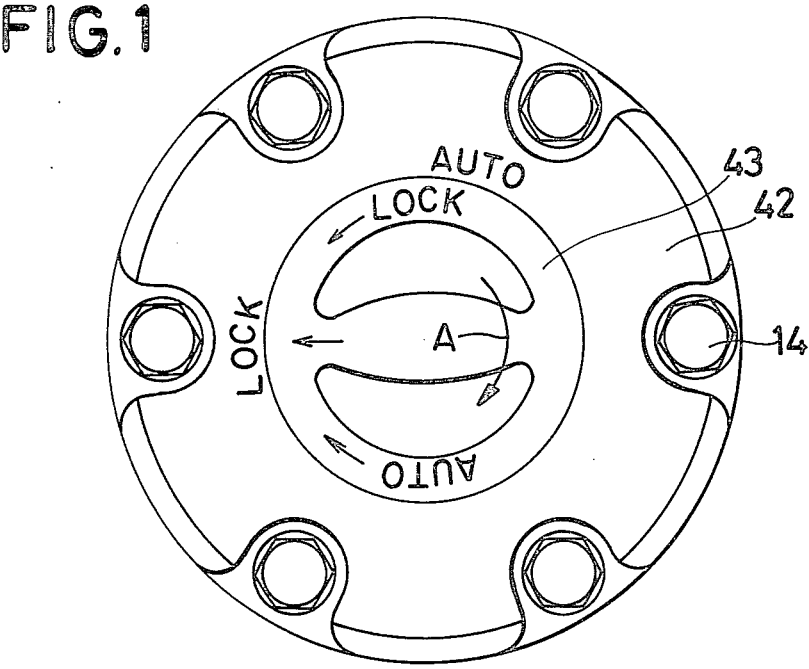
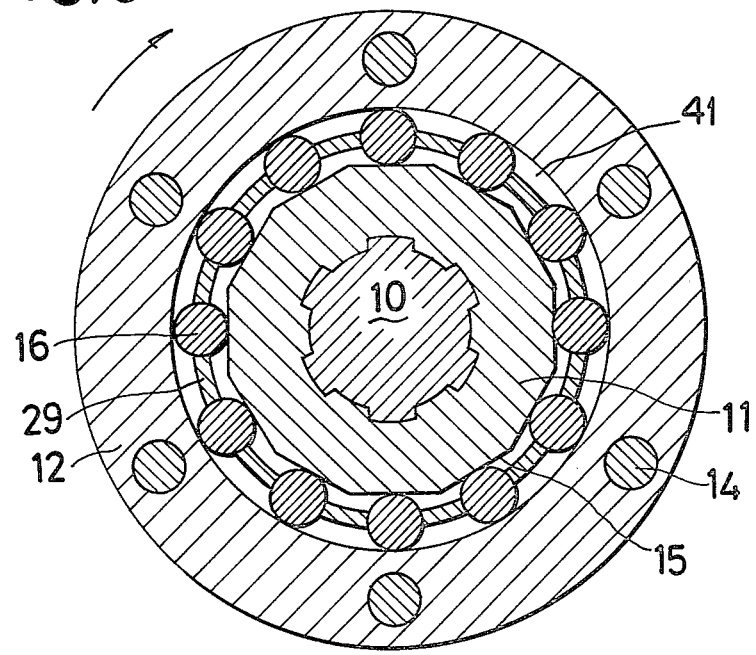
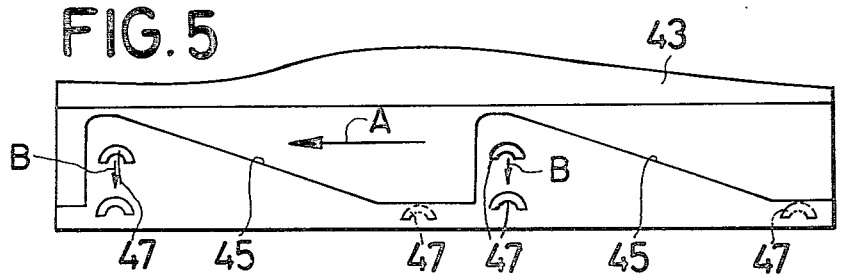

FREE WHEEL HUB APPARATUS FOR VEHICLES

BACKGROUND OF THE INVENTION

1. Field of the Invention

The present invention relates generally to a free wheel hub apparatus for vehicles and more particularly to a free wheel hub apparatus for vehicles in which a conversion between a torque transmitting and a free rotating position of a wheel to an axle shaft is automatically accomplished.

2. Description of the Prior Art

Conventionally, free wheel hub apparatuses in which a wheel is automatically connected to an axle shaft or freely rotated according to an input torque from an engine to the axle shaft are presented, and a free wheel hub apparatus in which a direct connecting state between an axle shaft and a wheel is accomplished by converting a free wheel-actuating state is also known.

The free wheel hub apparatus in which the direct connecting state between the axle shaft and the wheel is attained by a dog-clutch in the conventional apparatuses has disadvantages such as constructionally long axial length and heavy weight.

In order to shorten the long axial length and to lighten the heavy weight of the apparatus, a cage within the free wheel mechanism is connected or disconnected to or from the wheel side and one of the free wheel state or the direct connecting state is obtained by integrating the cage and the wheel or not. However, the cage is always frictionally connected to a knuckle so that the wear occurs at the frictional portion thereof and the apparatus is of poor lasting quality.

In the present invention, a direct connecting state between an axle shaft and a wheel is attained by conversion of a free wheel hub state upon operation of a handle.

SUMMARY OF THE INVENTION

It is an object of this invention to provide a free wheel hub apparatus for vehicles for obviating the above-mentioned conventional drawbacks.

It is another object of this invention to provide a unique and highly simplified free wheel hub apparatus for vehicles.

A more complete appreciation for the invention and many of the attendant advantages thereof will be readily apparent as the same becomes better understood by reference to the following detailed description, when considered in connection with the accompanying drawings.

BRIEF DESCRIPTION OF THE DRAWINGS

FIG. 1 is a front view of the present invention;
FIG. 3 is a similar view taken along the line III-III of FIG. 2;
FIG. 5 is an evolution view of the present invention, showing a cam face.

DETAILED DESCRIPTION OF THE PREFERRED EMBODIMENTS

Figure 2:
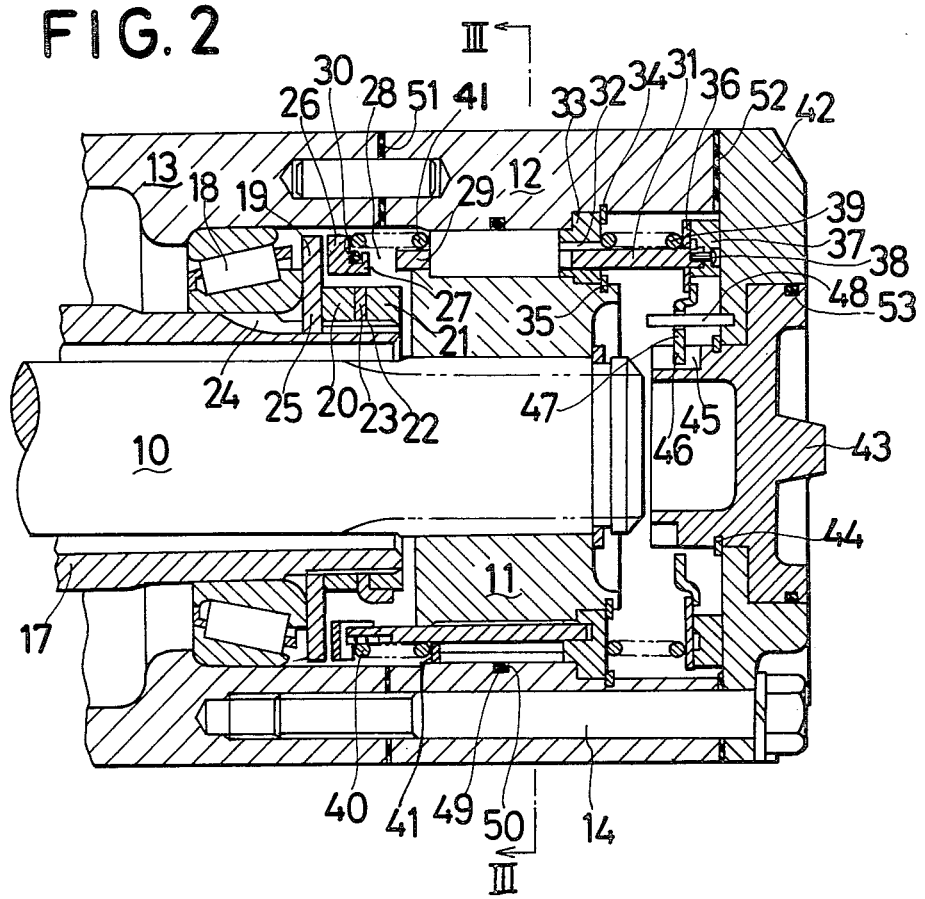
FIG. 2 is a sectional view of the present invention.
Figure 4:
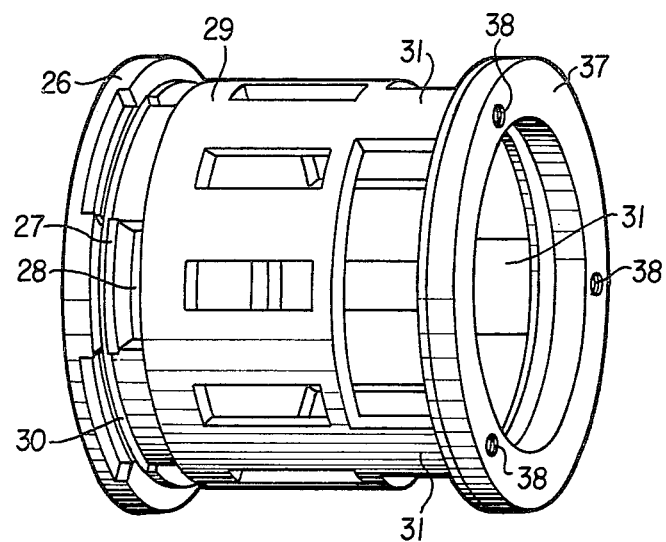
FIG. 4 is a view of a cage of the present invention.

Referring now to the drawings, and more particularly to FIG. 2 thereof, wherein the reference numeral 10 is an axle shaft and an inner member 11 is connected to the right end portion of the axle shaft 10 through a spline connection. The inner member 11 is covered by a cylindrical body 12 as clearly viewed from FIG. 3. The body 12 is integrally connected with a hub 13 by means of a bolt 14. The hub 13 is connected to a front wheel for vehicles so as to be integrally rotated therewith. The torque of the axle shaft 10 is transmitted from the inner member 11 to the body 12 through a free wheel mechanism hereinbelow detailed and then transmitted to a wheel through the hub 13.

The sectional shape of the inner member 11 exclusive of both ends thereof is polygonal, that is, the inner member 11 is provided with many flat faces 15 on the outer peripheral surface thereof as shown in FIG. 3. The same number of rollers 16 corresponding with the flat faces 15 of the inner member 11 are interposed between the flat faces 15 of the inner member 11 and the inner periphery of the body 12 to thereby construct a free wheel clutch mechanism. A tubular knuckle 17 in FIG. 2 is mounted on the vehicle body so as to be steered and is non-rotatable with respect to the rotating direction of the shaft 10. The hub 13 is supported by a bearing 18 mounted on the outer periphery of the knuckle 17. The rightward movement of the bearing 18 in FIG. 2 is restricted by a ring shaped plate 19 which is tightened to the bearing 18 by ring shaped nuts 20, 21. The knuckle 17 is provided with a screw 22 with threads on the outer periphery of the knuckle 17 and the female threads on the inner periphery of the nuts 20, 21 are engaged with the threads of screw 22 of the knuckle 17. A ring shaped plate 23 inserted between both nuts 20, 21 is provided so as to stop the loosening of the nuts 20, 21. The ring shaped plate 19 is non-rotatable with respect to the knuckle 17. Namely, a groove 24 is axially provided on the knuckle 17 and a projection 25 mounted on the inner periphery of the ring shaped plate 19 is fitted into the groove 24 of the knuckle 17 so that the plate 19 is held non-rotatable to the knuckle 17. A ring shaped frictional member 26 which is located at the right side of the plate 19 is provided with a projection 27 fixedly inserted into a recess 28 of a cage 29. The ring shaped frictional member 26 and the cage 29 are engaged by a ring 30 interposed between a peripheral directional groove on the outer periphery of the projection 27 and a peripheral directional groove on the outer periphery of the cage 29. The distance between each roller 16 is equal when held by the cage 29 as shown in FIGS. 2 and 3. The cage 29 is provided with a suitable number of arm portions 31 which are loosely penetrated into a window 32 of a bearing member 33. The bearing member 33 is rotatable relative to the inner member 11 and the body 12 and is prevented from moving axially by rings 34 and 35. The inner member 11 and the body 12 are concentrically held by the rings 34 and 35 in cooperation with bearing 33, cage 29 and rollers 16 and the rightward movement of each roller 16 is restricted by the ring 34 and 35 and the leftward movement thereof is restricted by the inner member 11. Each arm portion 31 of the cage 29 is supported by penetrating into a ring shaped plate 36 and the right end portion of each arm portion 31 is secured to a ring shaped frictional member 37 by means of a screw 38. A coil spring 39 is compressively interposed between the plate 36 and the bearing member 33. Ring shaped plate 36 is axially movable relative to cage 29 and is biased towards the right by the spring 39. The setting load of the coil spring 39 is larger than that of a coil spring 40 compressively interposed between the frictional member 26 and a plate 41 (which is contacted with the left end of each roller 16). As shown in FIG. 2, plate 41 is inserted into a space between inner member 11 and body 12 and is forced to be in contact with the left side surface of roller 16 by the force of coil spring 40.

A cover 42, as shown in FIG. 2, is secured to the body 12 by the bolt 14 and a handle 43 is rotatably inserted into the cover 42 as shown in FIGS. 1 and 2. The handle 43 is prevented from moving out of the cover 42 by a ring 44 and is provided with a cam face 45 on the flange portion having small diameter, as shown in FIG. 5, and a nail portion 46 of a circular plate 47 is engaged with the cam face 45. A pin 48, loosely penetrating the plate 47, is mounted on the cover 42 and the plate 47 is right or leftwardly movable through the cam face 45 according to the rotation of the handle 43. The outer peripheral end portion of the plate 47 is contacted with the right side of the inner peripheral end portion of the plate 36.

Consequently the handle 43 is rotated into one of two rotational directions as illustrated in FIG. 1, namely, the clockwise direction for the auto position or the counter clockwise direction for the lock position, the plate 47 is rightwardly or leftwardly moved along the cam face 45, and engages the plate 36 and the frictional member 26 is frictionally engaged with the plate 19 or the frictional member 37 is frictionally engaged with the cover 42.

A circular spring 49, disposed within an annular groove 50 of the inner periphery of the body 12, is provided so as to return the roller 16 to the flat portion 15 of the inner member 11. The reference numerals 51, 52 represent gaskets and 53 is an O-ring.

The operation of the invention will now be described hereinbelow in detail:

In the LOCK position illustrated in FIG. 1, the cam face 45 and plate 47 (nail portion 46) are separated from each other (i.e. each plate 47 is illustrated as a full line in FIG. 5). In FIG. 2, the plate 36 is forced to be disposed in a rightward position by the force of spring 39 and frictional member 37 is in contact with cover 42. Cage 29 is, accordingly, moved to the right and due to the movement thereof, the frictional member 26 is separated from the plate 19 by means of ring 30 which is engaged with the left end of cage 29. Under such conditions, when a slight relative rotation occurs between body 12 and inner member 11, the rollers 16 will be forced to enter between the inner periphery of the body 12 and the flat face 15 of the inner member 11 and therefore, inner member 11 and body 12 will rotate in unison. If the handle 43 is rotated about 120° in a clockwise direction as indicated by the arrow A in FIG. 1, the device will be disposed in the "AUTO position" and the cam faces 45 are moved to the left in FIG. 5 (the arrow A direction of FIG. 1). The plates 47 and nail portion 46 are then moved downwardly as shown in FIG. 5 (i.e. shown by arrow B) as indicated by the plates 47 in dotted line in FIG. 5. As is also shown in FIG. 5, the nail portions 46, which have been in contact with cam faces 45, are moved to the left as shown in FIG. 2 so as to move the plate 36 against the force of spring 39. Due to such leftward movement, frictional member 37 is disengaged from cover 42 and the left end of the cage 29 is disengaged from the ring 30. The frictional member 26 is then moved leftward by the force of spring 40 so as to be in contact with plate 19.

Under these conditions, the rollers 16 will be centered between flat faces 15 and the inner periphery of body 12 only when the number of rotations of the inner member 11 is higher than that of the body 12. Thereafter, body 12 and inner member 11 will rotate in unison and this means that torque transmission is available only in one direction (from inner member 11 to body 12). Accordingly, when the vehicle is in an engine brake condition or running on a down slope, rotation of the body 12 is higher than that of inner member 11 and therefore, torque transmission from body 12 to member 11 may be prevented.

With reference to FIG. 3, when the rotational speed of the inner member 11 becomes higher than that of body 12 subsequent to a condition of equal speed and same rotational direction, cage 29 rotates with a restriction insofar as it is in contact with plate 19 through frictional member 26 to generate a displacement of rollers 16 with respect to flat faces 15 which results in a wedge effect between the inner periphery of the body 12 and the flat faces 15. Thus, the inner member 11 and the body 12 rotate in unison through roller 16 and torque transmission from the inner member 11 to the body 12 may thus be obtained. When the rotational speed of the body 12 becomes higher than that of inner member 11, the wedge effect therebetween is cancelled and the roller 16 returns to the middle portion of the flat faces 15. Due to the force of spring 49, rollers 16 are kept centered on the flat faces 15 to maintain the unitary rotation thereof independently of rotational condition of the body 12. When the handle 43 is rotated in the clockwise direction A from the LOCK position shown in FIG. 1, the handle 43 is placed in the AUTO position. As a result, the axle shaft is driven by the operation of the driver of the vehicle, that is, the four wheel drive transfer apparatus (not shown) is driven. At this time the cage 29 is slightly and frictionally engaged with the knuckle 17 through the frictional member 26, ring shaped plate 19 etc. constructing a frictional clutch mechanism. Accordingly, the cage 29 is intended to be stopped at one position by the above engagement with the knuckle 17 even if the axle shaft 10 is driven. As the cage 29 is intended to be stopped from rotating while the axle shaft 10 is rotated as shown in FIG. 3, each roller 16 is squeezed between each flat face 15 of the inner member 11 and the inner periphery of the body 12, and the inner member 11 and the body 12 are integrally rotated. In this relationship, the torque is transmitted from the axle shaft 10 to the hub 13. Therefore, torque is transmitted to the wheel as far as the axle shaft 10 is driven. However, in case that the body 12 is more quickly rotated than the axle shaft 10 during driving of the axle shaft 10 (i.e. the vehicle runs down slope, etc.), the roller 16 squeezed between the flat face 15 of the inner member 11 and the inner periphery of the body 12 is disengaged from the above squeezing state and the integral rotation of the inner member 11 and the body 12 is momentarily disengaged. When the axle shaft 10 is continuously driven even though the integral rotation of the inner member 11 and the body 12 is momentarily disengaged, each roller 16 is again squeezed for the cage 29 always tends to stop rotation.

However, since the body 12 is more quickly rotated than the inner member 11, the roller 16 is taken out into the disengaging direction from above squeezing operation again. The above-mentioned operation is repeated and the free wheel state is continued. That is, the torque is not transmitted from the axle shaft 10 to the wheel through the body 12 and the hub 13.

Next the handle 43 is rotated into the AUTO position and the axle shaft 10 and engine drive are cut off by operating the transfer apparatus from the drivers seat and the four wheel driving operation of the axle shaft 10 is stopped. At this time the same operation of the body 12 results in the same more quickly rotated than the axle shaft 10 as abovedescribed sequence is performed and the free rotating state of the body 12 is obtained.

When the handle 43 is adjusted to the AUTO position, the axle shaft 10 is shifted from a four wheel drive operation to a two wheel drive operation by operating the transfer apparatus from the driver seat, thereby automatically shifting the wheel from a driving wheel to a free rotating wheel mode, and vice versa.

When it is desired that the body 12 (the wheel side) drives the axle shaft 10 (and the inner member 11) such as during engine braking, or travel down a slope as described above. The handle 43 in rotated into LOCK position in FIG. 1. Thereby the plate 47 engaged with the the AUTO position is rotated in the counterclockwise direction and consequently, the handle 43 is disposed in the LOCK position shown in FIG. 1. As a result thereof, the plate 47 is thereby engaged with the cam groove 45 of the handle 43 and is rightwardly moved by a coil spring 39 in FIG. 2. Frictional member 26 is disengaged from the plate 19 and the frictional member 37 is frictionally engaged with the cover 42 to thereby integrally rotate the cage 29 with the body 12.

As shown in FIG. 3, since the body 12 and the cage 29 are integrally connected by the above-described lock position operation, the cage 29 and each roller 16 becomes the drive side and is driven into direction indicated by the arrow upon engine brake, etc. The inner member 11 is the driven side at this time so that each roller 16 is squeezed between each flat face 15 and the inner periphery of the body 12 and the torque is transmitted from the body 12 to the inner member 11. Accordingly, the body 12 is the wheel side and the inner member 11 is the engine side to thereby present the engine brake state described hereinbelow.

As above described, when the body 12 and the cage 29 are in a locking relationship by operating the handle 43, the above engine brake state is obtained. On the contrary, it is obvious that the transmission of the torque can be performed from the inner member 11 to the body 12 and it is able to be performed in any direction of rotation. Accordingly when the body 12 and the cage 29 are locked, the axle shaft 10 and the body 12 are directly connected and the torque is transmitted into any direction.

The roller 16, having a cylindrical outer shape, is shown in FIG. 3 and a roller 16 having a ball shape or the like can be utilized therefore.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A free wheel hub apparatus for a vehicle including a wheel hub and an axle shaft, comprising:
   a body member integrally connected and rotatable with said wheel hub,
   an inner member disposed within said body member and integrally rotatable with said axle shaft,
   a bearing member interposed between an outer periphery of said inner member and an inner periphery of said body member so as to rotatably engage said inner member and said body member,
   a plurality of rollers interposed between said outer periphery of said inner member and said inner periphery of said body member,
   a cage member loosely penetrating said bearing member and including openings within which said plurality of rollers are disposed,
   a knuckle member non-rotatably mounted on said vehicle with respect to a rotational direction of said shaft,
   first frictional means attached to one end of said cage member and operatively engaging or disengaging said cage member with said knuckle member according to an axial movement of said cage member;
   said frictional means attached to another end of said cage member for engaging or disengaging said cage member with said body member according to said axial movement of said cage member; and
   means for axially moving said cage member.

2. A free wheel hub apparatus for vehicles as set forth in claim 1, wherein said inner member is provided with a plurality of flat faces thereon corresponding to said plurality of rollers.

3. A free wheel hub apparatus for vehicles as set forth in claim 1, wherein said cage member is provided with an arm portion for loosely penetrating said bearing member.

4. A free wheel hub apparatus for vehicles as set forth in claim 1, wherein said means for axially moving said cage member comprises:
   a manually operable handle provided with a cam face;
   a ring shaped plate engageable with said second frictional means and being axially movably supported on said cage member;
   means for biasing said ring shaped plate towards said second frictional means; and
   a circular plate member for engaging said ring shaped plate according to the operation of said handle to allow for movement of said cage member, said circular plate member being disposed within said body member and being engaged with said cam face of said handle.

* * * * *